United States Patent [19]

Chown

[11] Patent Number: 4,620,321
[45] Date of Patent: Oct. 28, 1986

[54] OPTICAL FIBRE RECEIVER

[75] Inventor: David P. M. Chown, Great Dunmow, England

[73] Assignee: STC plc, London, England

[21] Appl. No.: 610,487

[22] Filed: May 15, 1984

[30] Foreign Application Priority Data

May 19, 1983 [GB] United Kingdom ................. 8313855

[51] Int. Cl.$^4$ ............................................. H04B 9/00
[52] U.S. Cl. .................................. 455/619; 250/214 A; 330/59; 330/277; 330/308
[58] Field of Search ............... 455/607, 619, 608; 250/214, 214 A; 330/72-73, 59, 277, 308, 294, 300

[56] References Cited

FOREIGN PATENT DOCUMENTS 56-24834(A) 10/1981 Japan ................................ 455/608
2096852 10/1982 United Kingdom .
2101827 1/1983 United Kingdom .

OTHER PUBLICATIONS

"Receiver Design for Optical Fiber Systems", S. D. Personick, Proc. IEEE, vol. 65, No. 12, Dec. 1977, pp. 1670-1678.

Primary Examiner—Joseph A. Orsino, Jr.
Attorney, Agent, or Firm—Kerkam, Stowell, Kondracki & Clarke

[57] ABSTRACT

In an optical fibre receiver, the modulated light falls on a p-i-n diode (PD) connected to the input of an operational amplifier (A). This amplifier is shunted by a load resistor (R), which in turn is shunted by a non-linear Schottky diode (SD). This prevents a large pulse from spoiling the sensitivity of the receiver to a following smaller pulse.

This also provides the receiver with a low pass response having a relatively long time constant. In addition to this, the a.c. coupling response for the connection to the next stage of the system has a relatively short time constant. These two time constants combine to give an overall characteristic with a relatively narrow bandwidth, which enhances the above effect.

Finally, when the line muting function is needed, as between messages, the bit stream as detected includes a double amplitude pulse whose detection initiates the line muting function. This can be implemented by a double length pulse included in the bus bit stream which is so detected as to give a double amplitude pulse.

6 Claims, 7 Drawing Figures

U.S. Patent  Oct. 28, 1986  Sheet 1 of 2  4,620,321
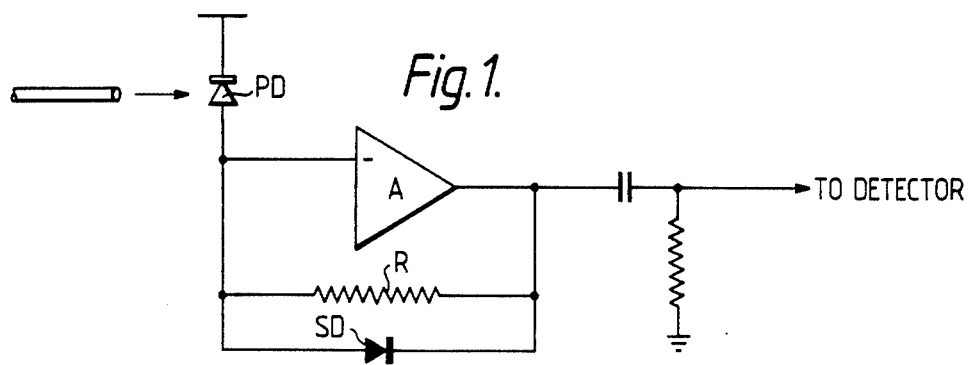
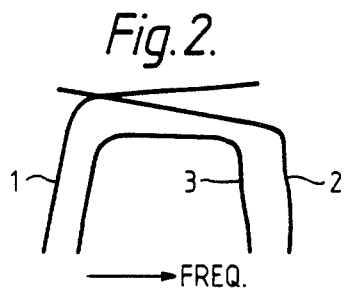
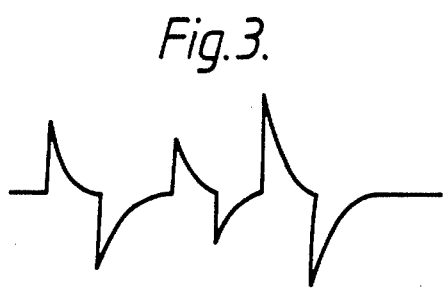
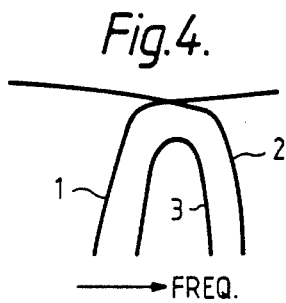
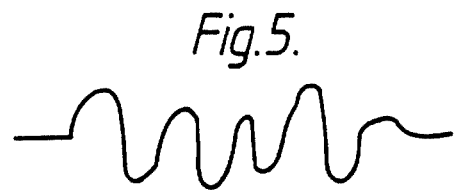
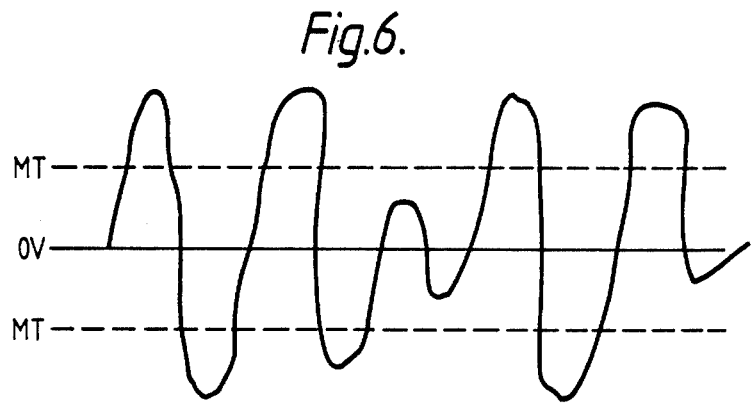

OPTICAL FIBRE RECEIVER

This invention relates to optical receivers, and to systems in which such receivers are used.

A conventional receiver for responding to a modulated light beam received from an optical fibre or via free space includes as a light-responsive device a photo-diode, usually a p-i-n diode. This diode is in series with a resistor with the diode-resistor junction connected to the input of an amplifier. When such a receiver has to have high sensitivity, its resistor just mentioned has to have a high value so that the current generated by the photo-diode produces a useful voltage across it. However, increasing the value of that resistor tends to reduce the dynamic range of the receiver.

An improvement on the above arrangement is described in our British Patent Specification No. 2096852A (D.P.M. Chown 3), which describes and claims an optical receiver in which optical energy propagating in an optical fibre transmission path is detected by a reverse-biassed p-i-n diode in series with a forward-biassed p-i-n diode, which latter replaces the resistor in the conventional arrangement. The junction between the two diodes is connected to the input of an amplifier which is part of a two-stage amplifier with automatic-equalisation. The forward-biassed diode by its characteristics leads to an improved dynamic range as compared with a conventional receiver.

Another improvement on the conventional arrangement is described and claimed in our British Patent Specification No. 2101827A (D.P.M. Chown 5). This describes an optical receiver similar in many respects to that of the above mentioned Patent Specification. Here also the light falls on a reverse-biassed p-i-n diode, which is in series with a forward-biassed p-i-n diode. The junction between the diodes is connected to the input of an amplifier which feeds an auto-equaliser. This auto-equaliser includes a forward-biassed p-i-n diode in series with the signal path. This third p-i-n diode is so biassed as to pass the same average current as the other two p-i-n diodes. The overall effect of this third diode is to provide the receiver with a substantial region in its characteristic whose frequency response is flat.

The present invention seeks to provide a number of improvements on the arrangements described in our above two Patent Specifications.

According to one aspect of the invention there is provided an optical receiver for the reception of a modulated light beam from an optical pulse transmission line or from free space, which includes a p-i-n diode on to which the modulated light beam is directed to produce therein an electrical current appropriate to the modulated beams, an amplifier to an input of which the diode is connected, the output of the amplifier being coupled to the detecting circuitry of the receiver when in use, a resistive load connected between said input and said output, and a non-linear diode connected in parallel with the resistive load, which diode acts as a dynamic load to prevent saturation of the amplifier under high input signal conditions.

According to another aspect of the invention there is provided an optical receiver for the reception of a modulated light beam from an optical fibre transmission line or from free space, in which the alternating current coupling response and the receiver low pass response are so related that the curve of the receiver's overall response has a relatively narrow frequency width, whereby the receiver's overall response is not reduced significantly after the reception of a high amplitude signal.

According to yet another aspect of the invention, there is provided an optical transmission system, in which when the muting function is required the bit stream includes one or more pulses whose magnitude exceeds the magnitudes of the other pulses in the bit stream, and in which the receiver of the system includes a threshold detector responsive to a said higher magnitude pulse to initiate the mute function.

Embodiments of the invention will now be described with reference to the accompanying drawings, in which FIG. 1 is a simplified diagram of an optical fibre receiver embodying the invention.

FIG. 2 is a diagram indicating the characteristics of a receiver with conventional frequency and time domain signal responses.

FIG. 3 is a waveform, diagram of signals received by a conventional receiver.

FIGS. 4 and 5 are diagrams similar to FIGS. 2 and 3 but for a receiver embodying the invention.

FIG. 6 is a waveform diagram illustrative of another aspect of the invention.

Figure 7:
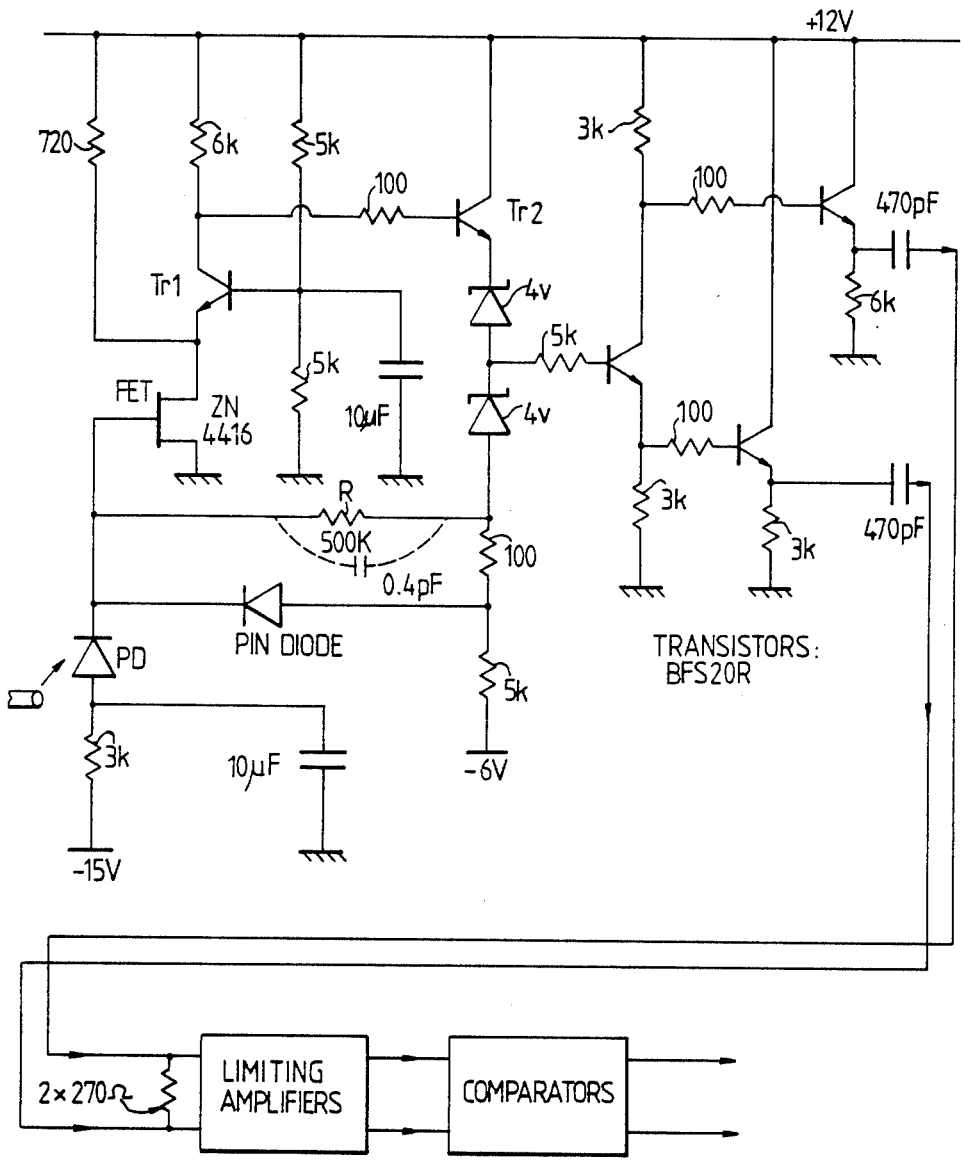
FIG. 7 is a more detailed diagram of a practical embodiment of the invention.

Optical fibre data bus systems pose a particular design challenge because received optical power levels can vary very greatly according to the optical loss between sending and receiving terminals. A receiver, or the receiving part of a transceiver, must be able to receive satisfactorily a signal at low optical level following closely after a signal of relatively very high level, the working range between these levels being known as intermessage dynamic range, IDR. An arrangement which maximises IDR and sensitivity (minimum optical power required for satisfactory operation) offers the user much enhanced flexibility in the optical interconnect topology. Three novel techniques of use in an optical receiver are described herein, which each individually, and in combination, result in improvements in IDR and sensitivity, when compared with conventional methods.

FIG. 1 shows a transimpedance optical receiver in which modulated light from an optical fibre, or received via free space, falls on a p-i-n diode PD connected to the inverting input of an operational amplifier A. The amplifier has a load resistor R connected across it, and has a Schottky diode SD as a non linear dynamic load in parallel with the resistor.

To obtain good sensitivity an optical receiver must use a high value of load resistor, since the square of the thermal noise current density is inversely proportional to the value of this resistor. On the other hand, all photocurrent must pass through the load resistor, so to allow operation with large optical signals a low value of load resistor is necessary. Conventional techniques involve a compromise value of load resistor giving only moderate sensitivity and IDR.

The present solution is to add a non-linear device such as a Schottky diode SD in parallel with the load resistor. A Schottky diode is chosen because of its very low self-capacitance, which allows a wide bandwidth to be obtained from the transimpedance receiver. At low optical inputs the Schottky diode has a high impedance and has little effect upon the receiver's response. With large optical inputs the Schottky diode conducts to limit the receiver's output and prevents saturation.

We now refer to FIGS. 2 and 4, in which curve 1 is the AC coupling response, curve 2 is the receiver low pass response, and curve 3 is the overall response. FIGS. 2 and 3 apply to a conventional receiver, and FIGS. 4 and 5 apply to a receiver embodying the invention.

The output of optical receivers must be a.c. coupled, as via the capacitor shown in FIG. 1, to prevent low level signals being masked by photodiode leakage particularly at high temperatures. Because optical signals are unipolar (no negative light or photocurrent) the a.c. coupling capacitor charges to the average value of the received optical level. When a low level bus message follows closely after a high level bus message, decoding is not possible until the a.c. coupling capacitor has discharged to the lower level. The a.c. time constant also defines the 'droop' of pulses emerging from the optical receiver. To ensure that droop is relatively small across a bit period, the a.c. coupling time constant must be set to a fraction of a bit period. Having done so, several tens of bit periods must be allowed between high and low level messages (at a ratio of say 1000:1 in intensity), causing low bus usage efficiency. In one case the available intermessage gap is defined as 2 bit periods, implying a very small IDR using conventional techniques. FIGS. 2 and 3 show the response curves and the resulting output in a conventional system.

The arrangement adopted in the present circuit, see also FIGS. 4 and 5, is to use the optical receiver's low pass response combined with the a.c. coupling high pass to produce a suitable overall bandpass response. Thus the low pass response of the optical receiver is "tailored" to give a narrow bandpass response in conjunction with the following high pass response, due to the time constant of the a.c. coupling at the receiver's output. The overall bandpass response thus produced results in a pulse shape at the output of more sinusoidal form, with a mid-pulse peak amplitude which is a reasonable fraction of the "input" peak amplitude. In addition, the narrow overall response restricts noise from the optical receiver, to the extent that there is a negligible overall sensitivity penalty when compared with a receiver not modified to give wide intermessage dynamic range (IDR).

As an example, if both the receiver's low pass time constant, and the a.c. coupling time constant, are set to 0.2 bit periods, mid-pulse peak amplitude is 0.35 times the "input", while after two bit periods the output has decayed to 1/5000 of this value. This represents an IDR capability in excess of 30 dB. The apparent penalty factor of 0.35 is almost wholly mitigated by the reduction in noise from the optical receiver due to the narrow overall passband.

Thus the use of the receiver's low pass response, followed by an a.c. coupling high pass response, to give a narrow bandpass response results in a desirable "sinusoidal-like" output waveform to the detector, which succeeds the receiver when used in a communication system. This also allows a wide IDR to be achieved with negligible sensitivity penalty, which is preferable to known alternatives in which an appreciable sacrifice in sensitivity is incurred to achieve wide intermessage dynamic range.

Conventional data transmission links usually transmit a continuous bit stream, and performance is defined in terms of the minimum received signal needed to maintain a given bit error rate. This is based on the assumption that receiver noise exceeds half the peak signal amplitude, resulting in a detected error, more often than the specified error rate.

Some data bus systems have to detect whether data is being received, in addition to the correct detection of received data. This need to distinguish the received signal from receiver noise usually causes a 3 dB sensitivity penalty since twice the signal strength is needed to exceed a new mute threshold. This penalty can be avoided by exploiting the fact that data will be so coded that it stays, say either for 0.5 or 1.0 bit periods in each of its two logical states, e.g. using Manchester or biphase coding as much used for optical transmission. When such a signal is passed through a circuit which has a partially integrating effect, as in the PIN-FET conventional receiver approach, or a narrow bandpass as described above, the signal has the general form indicated in FIG. 6. The sensitivity in terms of error detection as opposed to mute detection is determined by the lowest amplitude pulse, e.g. the one whose peak is below the mute threshold MT. The double length pulses have double height and can be used to trigger an intermessage mute function (IMF) when the mute threshold is cross. Thus an IMF is implemented without incurring the usual 3 dB penalty.

Thus in the present arrangement this penalty is circumvented by the use of a message coding format and receiver transfer function which result in a double amplitude pulse detected at the beginning of and during a message to operate the mute function without sensitivity penalty. Mute closure can be effected by the lack of data transitions during the intermessage gap.

Thus when the mute function is needed, a doubleamplitude pulse is included at the start of the message in the bit stream, see FIG. 6. This pulse can be an additional pulse, or an existing message pulse detected. It is recognised by a threshold detector (not shown) connected to the receiver's output. When it is detected the above-mentioned mute function is implemented. This mutes the receiver for a preset period, or until mute closure is effected by the lack of data transitions during an intermessage gap.

The inclusion of a pulse which, on detection, produces a double amplitude pulse can be done in either one of two ways. One is to make it a feature of the optical line coding used, while the other is based on a fixed parameter of the relevant bus protocol. The latter is the case for the MIL-STD-1553B protocol, so that in that case no special technique is needed to generate the special pulse. In either case the signals as transmitted on the bus include a double length pulse, which when it is dealt with by the receiver circuitry shown produces a double amplitude pulse. Thus when the double length pulse is fed through the receiver subsystem it is integrated in some systems, or narrowly bandpass filtered in the circuit described above to result in a double amplitude detected pulse. This pulse is the first pulse in the protocol specifically referred to above. Thus the special pulse on detection gives a pulse whose amplitude is at least twice the amplitude of the smallest received pulse, which latter determines the sensitivity of the receiver to data decoding. Thus a mute function to detect the presence of a received message to detect the presence of a received message as opposed to receiver noise can be implemented without incurring the usual 3 dB penalty.

We now turn to FIG. 7, which is a more detailed representation than FIG. 1 of an optical receiver embodying the invention. This receiver is the same in essence to that of FIG. 1, and will now be described with the emphasis on the arrangement whereby the a.c. coupling time constant and the low pass response are suitably "tailored" to produce the desired results.

In FIG. 7, the light from the optical fibre (or possibly from a light beam in free space) falls on a p-i-n diode PD which is reverse biased. This diode is connected to the input of an amplifier including a field effect transistor FET connected in cascode manner with an n-p-n transistor Tr1 whose collector is connected to the base of a similar transistor Tr2. The remainder of the amplification circuitry provides two outputs, each via a 470 pF capacitor and a 270 ohm resistor to the input of a limiting amplifier. The two resistors are in effect combined as a single 540 ohm resistor across the input of the limiting amplifier. The centre point of the resistance provides a virtual earth point, and the components give the required time constant of 127 ns. The limiting amplifier feeds comparators which extract from the pulsed output the signals conveyed over the fibre (or via the free space beam), which signals use frequency shift keying. These blocks are not described in detail as they can follow established practice.

As will have been apparent from the foregoing description, the important time constants are the low pass and high pass responses. The low pass response of the receiver is defined by the feedback resistor R, in this case 500 K.ohms and the effective capacitance across it. This is composed of its own self-capacitance, indicated in broken lines, which is of the order of 0.4 pF, plus that of the diode PD, plus the total shunt capacitance of the gate of FET divided by the forward gain of the combination of FET and Tr1. These capacitances result, typically, in 0.36 pF, which gives a time constant of 180 ns, i.e. a low pass—3 dB frequency of about 884 Hz. This time constant can have a rise of 160 to 180 ns, although the value chosen in the specific example gives excellent results.

The high pass response referred to is formed by the coupling to the limiting amplifiers, in this case the 470 pF capacitor which couples the output from the receiver into the 270 ohm input resistance of the limiting amplifier. This gives a time constant of 127 ns, i.e. a high pass—3 dB frequency of 1.25 MHz. This time constant can have a value in the range of 100–140 ns, although the specific value quoted gives excellent results.

Fibre optic systems usually need the receiver to recover its sensitivity fully within a very short period, in this case 2 microsec., following receipt of a high level signal. By keeping both of the time constants discussed above to less than 10% of this 2 microsec. figure the response following a large signal can be made to decay to about 1/4000 within this period. Hence it would be possible to detect a small signal of 1/4000 of the level of the large signal. If the diode PD connected across the feedback resistor is a non-linear p-i-n diode this figure can be improved to better than 1/10000.

Normally the narrow overall passband would not be regarded as adequate to receive satisfactory data at the required data rate, in this case 2 Mbit/sec, because the relatively low pass frequency would be expected to cause the received data to be differentiated. However, by "tailoring" the low and high pass frequencies in the manner described above, a satisfactory "sinusoidal" response can be obtained. This was also shown by a computer simulation, which shows recovery to 1/3970 times the height of the first message pulse in 2 microsec. Signal to raise ratio is also satisfactory, because the narrow overall response restricts the noise output as well as filtering the signal.

I claim:

1. An optical receiver for the reception of a modulated light beam, said receiver comprising:
   a p-i-n diode on to which the modulated light beam is directed to produce therein an electrical current appropriate to the modulation;
   an amplifier which includes a field effect transistor having a gate to which the p-i-n diode is connected, a second transistor whose emitter-collector path is in series with the source-drain path of the field effect transistor, and a third transistor, the output of the second transistor being coupled to the base of the third transistor;
   a feedback connection from the output of the third transistor to the gate of the field-effect transistor, said feedback connection including the parallel-connected combination of a resistive load impedance and a non-linear diode, which diode is so poled and has parameters such that it acts as a dynamic load to prevent saturation of the amplifier under high input signal conditions, the parameters of the resistor and the diode being such that the receiver including the said amplifier has a low pass response with a relatively long time constant, e.g. in the range of 160 to 180 ns;
   the output of the third transistor being coupled to the output of the amplifier; and
   circuit elements which couple the amplifier output to a utilisation circuit and which provide for said amplifier output an alternating current coupling response which has a relatively short time constant, e.g. in the range of 100–400 ns;
   wherein the combination of the said low pass response with the said alternating current coupling response ensures that the receiver has an overall relatively narrow bandwidth response, such that the receiver's overall response is not reduced significantly after the reception of a high amplitude signal.

2. An optical receiver as claimed in claim 1, wherein said non-linear diode is a Schottky diode.

3. An optical receiver as claimed in claim 1, wherein the said circuit elements which couple the amplifier's output to a utilisation circuit include a capacitor of 470 pF connected to the output of the said amplifier, together with a resistor of 270K ohm fed therefrom, and wherein the said resistor connected between the output of the third transistor and the gate of the field-effect transistor has a value of 500K ohms.

4. An optical receiver as claimed in claim 3, wherein said non-linear diode is a Schottky diode.

5. An optical receiver as claimed in claim 1, which includes a fourth transistor whose base is connected to the emitter of said third transistor, and a pair of output transistors whose base inputs are connected respectively to the collector and the emitter of said fourth transistor, the outputs of the output transistors providing the receiver with two outputs.

6. An optical receiver as claimed in claim 5, wherein said non-linear diode is a Schottky diode.

* * * * *